Feb. 4, 1969  H. LANZENBERGER  3,425,319
MILLING MACHINE WITH PIVOTAL SPINDLE HEAD
Filed Feb. 6, 1967  Sheet 1 of 2

INVENTOR
HORST LANZENBERGER
BY Brady, O'Boyle & Gates
ATTORNEYS

United States Patent Office 3,425,319
Patented Feb. 4, 1969

3,425,319
MILLING MACHINE WITH PIVOTAL SPINDLE HEAD
Horst Lanzenberger, Munich, Germany, assignor to Hans Deckel, Munich, Germany, and Friedrich W. Deckel, Zug, Switzerland
Filed Feb. 6, 1967, Ser. No. 614,245
Claims priority, application Germany, Feb. 7, 1967, D 49,305
U.S. Cl. 90—11                    10 Claims
Int. Cl. B23c 7/00, 1/00, 3/00

ABSTRACT OF THE DISCLOSURE

A machine tool, such as a milling machine, with two working spindles for operation on a workpiece on a clamping table, where both spindles share a common drive means. One working spindle is a horizontal spindle and the other is a vertical spindle pivotally mounted to an adaptor which in turn is pivotally mounted to the horizontal spindle housing at a distance above the horizontal spindle. The vertical spindle is pivotally movable to an uppermost and a lowermost working position and in one of these positions the horizontal working spindle is free for operation on the workpiece, simultaneously with operation of the vertical working spindle, if desired, without moving the vertical spindle to a nonworking position or removing it from the machine, as required in the past.

Background of the invention

Among machine tools, such as milling machines, with a pivotable spindle head to which the present invention relates, a machine is known in the prior art in which the spindle head which contains a vertical working spindle is not attached directly to the horizontally shiftable spindle housing, but is rather attached to the horizontally shiftable spindle housing by means of an adaptor having two parallel shafts coupled to each other by gears. One of these shafts of the adaptor is attached concentric to the horizontal working spindle mounted in the horizontal shiftable spindle housing, thus coupling the shaft to the horizontal spindle. The spindle head through the gearing therein, is attached to the other shaft of the adaptor so as to be concentric therewith. The adaptor can pivot relative to the spindle housing around its first mentioned shaft, and in the same manner, the spindle head can pivot relative to the adaptor around the other mentioned shaft of the adaptor. This design has the advantage that, by pivoting the adaptor, the spindle head with the vertical working spindle can be moved into an uppermost working position and a lowermost working position, where the differential in level between the two positions amounts to twice the distance of the two shafts of the adaptor from each other. The uppermost working position is preferred for drilling operations with the vertical spindle while the lowermost working position is intended for milling operations with the vertical spindle.

However, since in the prior art machine the pivotable vertical spindle is attached and thus connected to the horizontal spindle through the spindle head, adaptor, and shafts of the adaptor, the horizontal spindle cannot be used for working on the workpiece when the pivoting vertical spindle is mounted in place or is in use. The horizontal spindle can only be used when the pivoting vertical spindle with the adaptor is removed from the horizontal spindle and spindle housing. It is the primary objective of the present invention to improve this complicated operating mode.

An approach to solving the unfavorable features of the prior art machine is shown in U.S. Patent 3,295,415, issued Jan. 3, 1967, to Johann Muller, and owned by the assignees of the present application, which provides structure whereby the pivotable vertical spindle does not have to be removed from the machine but merely pivoted to one side and retracted to free the horizontal working spindle for use. However, the machine of this patent does not provide a machine in which the pivotable vertical spindle can be left in a working position while at the same time the horizontal working spindle is free and in a working position.

Summary of the invention

The present invention provides a machine tool, such as a universal milling machine, with a pivotable spindle head carrying a vertical working spindle, attached to one shaft of an adaptor housing, which has a second shaft connected to the spindle housing parallel to and at a distance above the horizontal working spindle, rather than connected concentric to the horizontal spindle as in the prior art. The spindle head and adaptor can be pivoted about the first and second shafts, respectively, to bring the vertical working spindle into either an uppermost or a lowermost working position. In the lowermost working position the adaptor protrudes into the area of the horizontal spindle, but in the uppermost working position it frees the horizontal spindle so that it becomes usable without having to take the pivoting spindle off the machine or move it to an inoperative position. If desired, in this position the horizontal and vertical working spindle may be used simultaneously. Moreover, in the lowermost position of the spindle head, in which milling work is primarily performed by the vertical spindle, and in which transfer of considerable forces to the spindle occur, this arrangement opens up the advantageous possibility of additionally screwing or otherwise securing the adaptor to the spindle housing to provide greater tool rigidity. This additional attachment of the adaptor is particularly effective because the connection is at a very short distance from the tool in the vertical working spindle.

The design according to the invention is also advantageous compared to an older suggestion of designing the spindle head asymmetrically to its pivot axis and providing it with a vertical spindle capable of receiving a tool at both ends, because in the older case the vertical spindle nose intended for milling is spaced further away from its pivot axis, while this distance is as small as possible in the present invention and this is an object of the invention.

The provision in the machine of the present invention of fastening the adaptor in its lowermost position to the spindle housing is of particular advantage when the pivot axis of the adaptor relative to the spindle housing is not located directly on the spindle housing itself, but on a body portion mounted on the spindle housing so as to be horizontally adjustable or movable thereon. Additional features of the invention follow from the specification description hereinafter following of an implementation example illustrated in the drawings.

*Description of the preferred embodiment*

Figure 1:
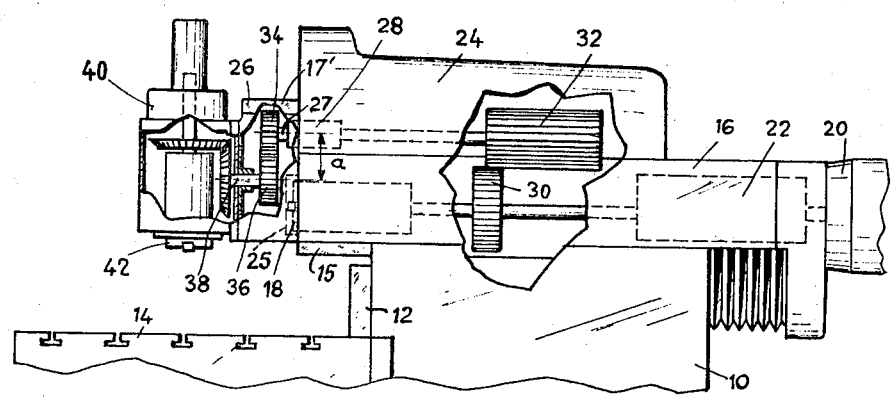
FIG. 1 is a side elevational view, with parts broken away, of the upper portion of a universal milling machine, according to the invention, with the spindle head positioned in the lowermost position for milling operation.

Referring to the drawings in greater detail wherein like numerals designate like components a chucking or work table 14 for holding a workpiece (not shown) upon which the universal milling machine is to perform machine operation, is connected in ways or dovetail guides 12 on machine stand 10 for vertical adjustable movement relative thereto. A spindle housing 16, in which horizontal spindle 18 is mounted for rotation, is connected for adjustable horizontal movement in a direction transverse of the table 14, on the top of machine stand 10 by means of dovetail guide 15, or the like. The horizontal spindle 18, which is adapted to receive a machining tool such as a milling tool bit, is rotatively driven through change-over gearing 22, of the usual type, by motor 20 connected to the rear of spindle housing 16. The spindle housing 16 is moved in its guide transversely of stand 10, in known manner, by means of a hand wheel and/or motor drive means, not shown.

Figure 3:
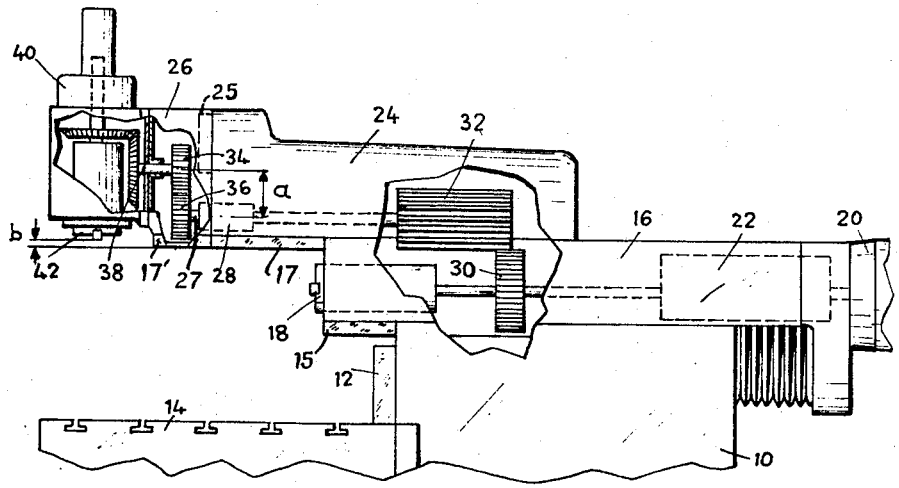
FIG. 3 is a view similar to FIG. 1 showing the spindle head positioned in the uppermost position for drilling work, and showing the horizontal spindle free for operation.
Figure 4:
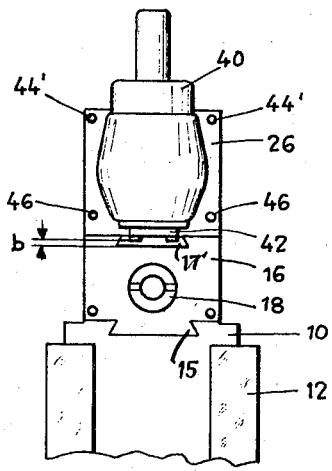
FIG. 4 is a front elevational view of the machine as positioned in FIG. 3.

A body portion 24, when applicable, is connected through guide 17, FIGS. 3 and 4, to the top of spindle housing 16 and is horizontally movable thereon, in known manner, in a direction transverse of the work table by means of a hand wheel and/or motor drive means, not shown. In certain machines incorporating the invention body portion 24 may be an integral portion of spindle housing 16, but when they are separately movable members they can be positioned as in FIG. 1 with the front portions thereof in substantially vertical alignment, or the body portion 24 can be positioned to overhang the table 14 at selected positions to take on the form of a cantilevered arm.

An adaptor housing 26, having a shaft 27 journaled therein, is attached adjacent the front wall of body portion 24 by a connection between shafts 27 and 28, the latter shaft being journaled in body portion 24. Shafts 27 and 28 are thus in effect one shaft and adaptor 26 is attached so it can pivot about the axis of shaft 28. Gears 30 and 32 in spindle housing 16 and body portion 24, respectively, connect shaft 28 with horizontal spindle 18 such that shaft 28 is also rotatively driven by motor 20.

Interiorly of adaptor 26 a gear 34 is connected to shaft 27 to drive shaft 38 via gear 36. Shaft 38 which protrudes from the opposite face of adaptor 26 than shaft 27, is disposed parallel to shaft 28 and is spaced from it in the vertical plane by a distance $a$.

A spindle head 40, in which is mounted the pivoting or vertical spindle 42, is attached through gearing to adaptor 26 so as to be pivotable around the axis of shaft 38. The vertical spindle is adapted in known manner to receive a tool bit for performing machining operations on a workpiece on the table.

Figure 2:
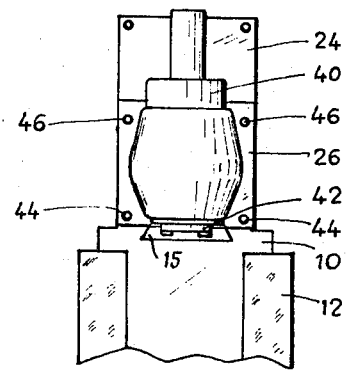
FIG. 2 is a front elevational view of the machine according to FIG. 1.

FIGS. 1 and 2 show the machine of the invention set up for milling operation with pivoting or vertical spindle 42. For the machine arrangement, adaptor 26 is positioned in its lowermost position and extends downwardly into the area of spindle housing 16 and overlies and rests against the front surface of the spindle housing. Body portion 24 is retracted relative to spindle housing 16 along guide 17 to firmly wedge the adaptor to the spindle housing, and the connection is made more firm by the structure whereby the portion of horizontal spindle 18 which protrudes from the front surface of housing 16 extends into a registering recess 25 in adaptor 26. The adaptor 26 is then screwed to the front face of the spindle housing by means of screws 44, and to the front face of body portion 24 by means of screws 46 to provide a rigid and very stable connection between the spindle head 40 and the spindle housing 16, as required to absorb the strong forces developed in milling operations. Thereby, the milling cutter in spindle 42, very much in contrast to the known milling machine described at the outset, has an extremely short vertical distance from the horizontal guide 15 of spindle housing 16 at the top portion of machine stand 10. During milling operations, body portion 24 and spindle housing 16 may be shifted as a unit transversely of the table 14.

The spindle head 40 and adaptor 26 are shown in the uppermost position in FIGS. 3 and 4, which position is appropriate for drilling operations and workpiece. As compared to the machine arrangement of FIGS. 1 and 2, the adaptor 26 is pivoted by 180° relative to body portion 24, and spindle head 40 is pivoted by 180° relative to adaptor 26. Adaptor 26 overlies only the front face of body portion 24 and is rigidly fastened thereto by means of screws 46 and 44'. Adaptor 26 on one of its horizontal surfaces carries a guide section 17' which registers with guide 17, FIG. 3, when the adaptor is in the uppermost position. Body portion 24 can be selectively shifted horizontally on spindle housing 16, as previously set forth, so that a wide overhang of the tool in spindle 42 relative to the table 14, can be selectively achieved. In this position, as shown in FIGS. 3 and 4, the horizontal spindle is free for machining operations, and if desired both the vertical and horizontal spindles can be operated simultaneously. It will be noted that gear 32 is relatively wide so that a sliding mesh drive is maintained with gear 30.

With this construction, spindle housing 16 can also be selectively shifted horizontally on machine stand 10. Between the terminal end of vertical spindle 42 and horizontal guide 17, which movably guides body portion 24 on housing 16, there exists a certain clearance distance indicated at $b$ in FIGS. 3 and 4, and this clearance allows body portion 24 to be moved rearwardly on guide 17 to a position where spindle head 40 is retracted (not shown) behind the nose of horizontal spindle 18. Comparing this stated position with FIG. 1, it will be understood that gear 32 will slide out of meshing engagement with gear 30 and the vertical spindle 42 will be disengaged from operation. In this position the horizontal spindle is still free and the table is cleared overhead so that spindle 18 can operate on a much larger workpiece on table 14. Vertical spindle 42 is thus retracted to a storage position without having to pivot the spindle 42 into a horizontal position as is required in the mentioned prior art patent. The vertical spindle 42 thus remains in a vertical position when not being used and this eliminates a machine manipulation. It will be noted that guide portion 17' registering with guide 17 supports the adaptor and spindle head when retracting the spindle to the stored position.

While the invention has been shown and described in a certain preferred embodiment it is realized that modifications can be made without departing from the spirit of the invention, and it is understood that no limitations on the invention are intended other than those imposed by the scope of the appended claims.

I claim:

1. In a machine tool with at least a pair of working spindles, a machine stand, a spindle housing mounted on said machine stand, a horizontal spindle means mounted for rotation on said spindle housing, a first shaft journaled for rotation on said spindle housing, drive adaptor means connected to said first shaft and pivotable thereabout whereby said first shaft defines a first horizontal pivot axis, a second shaft journaled on said drive adaptor means and coupled with said first shaft, generally vertical spindle means connected to be driven by said second shaft and pivotable about said second shaft which defines a second horizontal pivot axis, said first and second horizontal pivot axes disposed parallel spaced relation, drive means connected to rotate said first shaft and said horizontal spindle means, and said first horizontal pivot axis disposed generally parallel to and at a predetermined distance above said horizontal spindle means.

2. A machine tool as set forth in claim 1 in which said spindle housing is displaceably mounted on said machine stand, said spindle housing including a body portion displaceably mounted on said spindle housing, and said first shaft journaled for rotation on said body portion.

3. A machine tool as set forth in claim 1 in which said spindle housing includes a body portion horizontally displaceably mounted on said spindle housing, and said first shaft defining said first horizontal pivot axis connected in said body portion.

4. A machine tool as set forth in claim 1 in which said spindle housing is horizontally displaceably mounted on said machine stand.

5. A machine tool as set forth in claim 1 including fastening means rigidly connecting said drive adaptor means to said spindle housing.

6. A machine tool as set forth in claim 1 in which said drive adaptor means is connected adjacent the front face of said spindle housing, said drive adaptor means pivotal to an upper and a lower position relative to said spindle housing, and said vertical spindle means pivotal between an upper and a lower position relative to said drive adaptor means.

7. A machine tool as set forth in claim 1 in which said drive adaptor means includes a recess therein, said drive adaptor means pivotable between an upper and a lower position, and said horizontal spindle means extending into said recess when said drive adaptor means is in the lower position.

8. A machine tool as set forth in claim 7 in which said spindle housing includes a body portion horizontally displaceably mounted on said spindle housing, and said first shaft defining said first horizontal pivot axis connected in said body portion.

9. A machine tool as set forth in claim 8 in which said drive adaptor means overlies the front faces of said body portion and said spindle housing in the lower position thereof, and fastening means rigidly connecting said drive adaptor means to said spindle housing and said body portion.

10. A machine tool as set forth in claim 8 in which said drive adaptor means overlies only the front face of said body portion in the upper position thereof, whereby said adaptor means and generally vertical spindle means are positioned above said spindle housing, and said horizontal spindle means and vertical spindle means are free for machining operations.

References Cited

UNITED STATES PATENTS

| | | | |
|---|---|---|---|
| 3,117,493 | 1/1964 | Zwick et al. | 90—14 |
| 3,295,415 | 1/1967 | Muller | 90—14 |
| 3,338,135 | 8/1967 | Muller | 90—11 |

GERALD A. POST, *Primary Examiner.*

U.S. Cl. X.R.

29—26, 27; 90—14, 16